(12) United States Patent
Ament

(10) Patent No.: US 6,857,264 B2
(45) Date of Patent: Feb. 22, 2005

(54) EXHAUST EMISSION AFTERTREATMENT

(75) Inventor: Frank Ament, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/325,499

(22) Filed: Dec. 19, 2002

(65) Prior Publication Data
US 2004/0118107 A1 Jun. 24, 2004

(51) Int. Cl.[7] .............................................. F01N 3/00
(52) U.S. Cl. .......................... 60/284; 60/274; 60/295; 60/301; 123/198 F; 123/481
(58) Field of Search ..................... 60/274, 284, 285, 60/295, 301; 123/198 F, 481

(56) References Cited

U.S. PATENT DOCUMENTS

| | | | | |
|---|---|---|---|---|
| 4,134,261 A | * | 1/1979 | Iizuka et al. ................... | 60/276 |
| 4,337,740 A | * | 7/1982 | Sugasawa et al. ........... | 123/672 |
| 4,522,179 A | * | 6/1985 | Nishimura et al. .......... | 123/481 |
| 4,637,363 A | * | 1/1987 | Schmid ........................ | 123/481 |
| 5,007,390 A | * | 4/1991 | Tanaka et al. .......... | 123/179.15 |
| 5,099,816 A | * | 3/1992 | Ohga et al. .................. | 123/481 |
| 5,930,992 A | * | 8/1999 | Esch et al. ..................... | 60/274 |
| 6,023,929 A | * | 2/2000 | Ma .............................. | 60/295 |
| 6,164,065 A | * | 12/2000 | Denari et al. ................. | 60/284 |
| 6,182,446 B1 | * | 2/2001 | Gunther et al. ............... | 60/278 |
| 6,205,776 B1 | * | 3/2001 | Otsuka ......................... | 60/285 |
| 6,276,138 B1 | * | 8/2001 | Welch .......................... | 60/602 |
| 6,389,806 B1 | * | 5/2002 | Glugla et al. ................. | 60/284 |
| 6,408,618 B2 | * | 6/2002 | Ide .............................. | 60/285 |
| 6,415,601 B1 | * | 7/2002 | Glugla et al. ................. | 60/284 |
| 6,687,603 B2 | * | 2/2004 | Wakashiro et al. ......... | 701/110 |

* cited by examiner

Primary Examiner—Thomas Denion
Assistant Examiner—Diem Tran
(74) Attorney, Agent, or Firm—Christopher DeVries (57) ABSTRACT

An engine control system in a vehicle including a variable displacement internal combustion engine, a controller for controlling the displacement of the variable displacement internal combustion engine, and where the controller operates the variable displacement internal combustion engine in a partially displaced operating mode upon startup to increase exhaust gas temperature.

8 Claims, 7 Drawing Sheets

EXHAUST EMISSION AFTERTREATMENT

TECHNICAL FIELD

The present invention relates to the control of internal combustion engines. More specifically, the present invention relates to a method and apparatus to control a variable displacement internal combustion engine such as a diesel engine, or any in-cylinder fuel injected engine, to improve catalytic efficiency.

BACKGROUND OF THE INVENTION

Present regulatory conditions in the automotive market have led to an increasing demand to reduce emissions in present vehicles. Catalytic converters and NOx traps or absorption/adsorption units are among the primary tools used to reduce emissions in vehicles.

A catalytic converter oxidizes hydrocarbons (HC) and carbon monoxide (CO) emissions in a vehicle into relatively benign compounds such as carbon dioxide ($CO_2$) and water. A catalytic converter typically includes a specific catalyst formulation including platinum, palladium and rhodium to reduce oxides of Nitrogen (NOx), HC and CO simultaneously. The conversion efficiency of a catalyst depends on the temperature of the catalyst and the air/fuel ratio.

Figure 1:
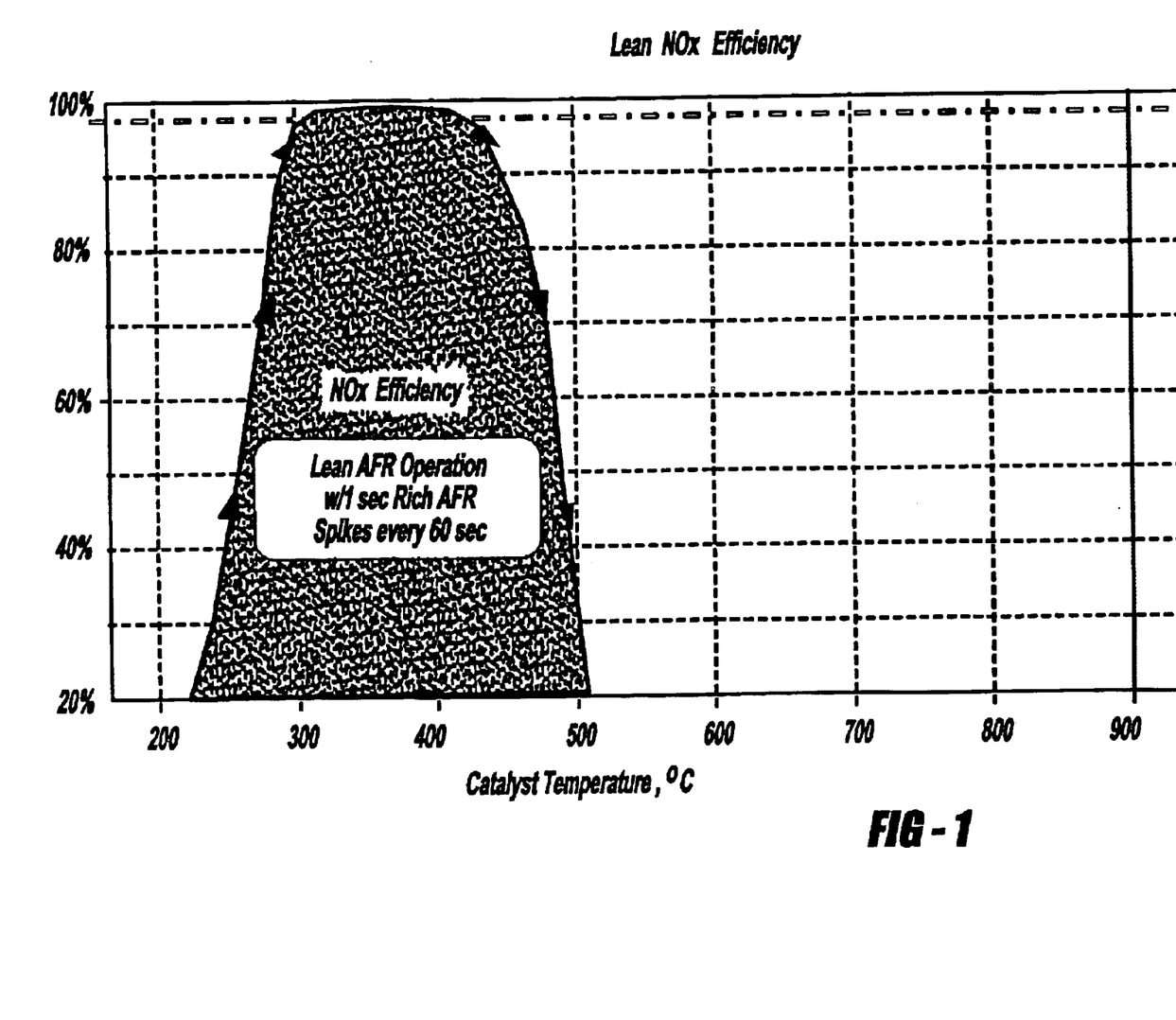
FIG. 1 is a plot of catalyst efficiency versus temperature for the present invention.

The functional temperature range for a typical NOx trapping and three-way conversion catalyst is shown in FIG. 1. These operating temperature windows are consistent with gasoline direct injected engine exhaust architectures and vehicle operating modes. As shown in this example, peak NOx conversion efficiency is obtained in the 250° C.–450° C. temperature range. These temperatures may vary somewhat based on the specific formulation of precious metals and NOx trapping materials. These temperatures are high enough to simultaneously clean up the HC and CO emissions. The catalyst formulation shown effectively traps NOx during lean air/fuel operation by catalyzing NO to $NO_2$, and then chemically storing it as a nitrate ($NO_3$) compound on a washcoat surface. When all the NOx storage sites are filled, a reducing (oxygen-deficient, CO-rich) exhaust environment is created in the catalytic converter. The reducing environment causes the stored nitrate ($NO_3$) to be released as gaseous $NO_2$. The $NO_2$ can be further reduced to nitrogen, $N_2$ at a precious metal site, such as platinum, if sufficient reductants such as HC, CO and $H_2$ are present.

The typical precious metal catalyst formulations maintain very high conversion efficiencies up to temperatures of 900° C. The NOx storage compounds, such as barium or potassium, that are added to the three-way catalysts are usually stable up to temperatures of approximately 850° C.

NOx trap performance on diesel engine applications is severely limited by the lower exhaust gas temperatures and the difficulty of providing frequent, rich exhaust mixtures to the catalyst. A diesel engine's very low exhaust temperatures are the result of very lean operation, and higher compression and expansion ratios. These are the same attributes that account for the higher fuel efficiency compared to the spark-ignited gasoline engine.

Air/fuel ratios may be defined as lean or rich or somewhere in between. An air/fuel mixture is represented by a ratio called the equivalence ratio that is represented by the symbol $\lambda$. The equivalence ratio is defined by the following equation:

$$\lambda = \frac{\text{(air/fuel)}}{\text{(air/fuel stoichiometry)}}$$

A relatively low air/fuel ratio below 14.7 ($\lambda<1$) is characterized as a rich mixture, and an air/fuel ratio above 14.7 ($\lambda>1$) can be characterized as a lean mixture. Traditional vehicle gasoline engines are operated at stoichiometry since most regulated exhaust gases can be reduced at stoichiometry. If vehicle engines are operated on lean mixtures, such as diesel or direct injection gasoline engines having lean stratified operations, the NOx compounds generated may not be sufficiently reduced by traditional three way catalysis. Therefore, these engines have difficulty meeting the increasingly stringent exhaust emissions regulations.

SUMMARY OF THE INVENTION

The present invention is a method and apparatus for the control of cylinder deactivation in an engine to control the exhaust gas temperature for improved catalytic converter or NOx trap efficiency. More importantly, the deactivated cylinders are used as partial oxidation reactors to generate rich combustion products which can be exhausted to purge and reduce the NOx emissions that are stored in the NOx trap.

There are several methods of controlling valve train activation on internal combustion engines (ICEs), depending on the number of valves per cylinder and the cam and valve actuation configurations. The present invention may be used with any mechanization that deactivates cylinders in an ICE including, but not limited to, overhead valve and overhead cam ICEs.

Controlling cylinder deactivation in a variable displacement ICE, depends on the ICE bank configuration and firing order. For example, certain V6 and V12 engine configurations allow deactivation of an entire bank of cylinders (one side of the engine), while a line 6 engine may allow three adjacent cylinders to be deactivated. These types of engines may allow favorable grouping of the exhaust flows to enhance aftertreatment performance.

In one embodiment of the present invention, an eight-cylinder diesel (compression ignition) internal combustion engine (ICE) may be operated as a four-cylinder engine by deactivating four cylinders. The cylinders in the preferred embodiment are deactivated by an electro-hydraulic deactivation system using engine oil pressure, controlled by solenoids, to pressurize the locking pins of special engine valve lifters used in an overhead valve engine. With pressure applied, the locking pins allow the lifter to act as a lost motion device to prevent exhaust and intake valve activation.

Under lean operating conditions such as found in diesel engines, or direct injection gasoline engines operating under lean stratified conditions, a NOx trap is used to capture NOx emission from the exhaust gas flow. Periodically (once the NOx trap is saturated, or at some predetermined threshold), the air/fuel mixture is adjusted to a provide a short, rich exhaust spike to release and chemically reduce the NOx emissions stored in the NOx trap. The excess carbon monoxide and hydrocarbons generated by the rich air/fuel mixture provide the reductants to react with the released NOx emissions and reduce it to nitrogen $N_2$ and oxygen $O_2$. The frequency of NOx trap regeneration is calibrated as a function of the capacity of the NOx trap.

Cylinder deactivation is used to raise the exhaust gas temperatures and reduce excess exhaust air, richening the air/fuel ratio into the NOx trap. The deactivated cylinders in the present invention may be used as partial oxidation (POx) reactors to provide rich exhaust products to purge the NOx trap.

The POx products are generated by trapping combustion products in the deactivated cylinders and injecting additional fuel during successive cylinder events. The amount and timing of the POx injections can be optimized with engine dynamometer testing to provide the best reductant formation with minimum torque impact. Because the cylinders are closed and the initial contents are known, the additional fuel can be precisely metered to achieve the desired reductant chemistry. The repeated mixing of the combustion products with small amounts of additional burning during successive cycles also improves the air utilization in the cylinder. Air utilization is a limiting factor with direct injected heterogeneous combustion engines, whether they are compression or spark ignited. Unlike intake port injected engines, with homogeneous charge engines the fuel is injected directly into the cylinder and there is little time for fuel vaporization and air mixing. As a result, heterogeneous combustion engines should operate lean of stoichiometric mixtures to avoid high soot, unburned hydrocarbons and carbon particulate emissions. The air utilization limitation is overcome in the deactivated cylinders by allowing the burned cylinder gases and remaining air to be thoroughly mixed, and incrementally burned during several, successive engine cycles.

DESCRIPTION OF THE PREFERRED EMBODIMENT

Figure 2:
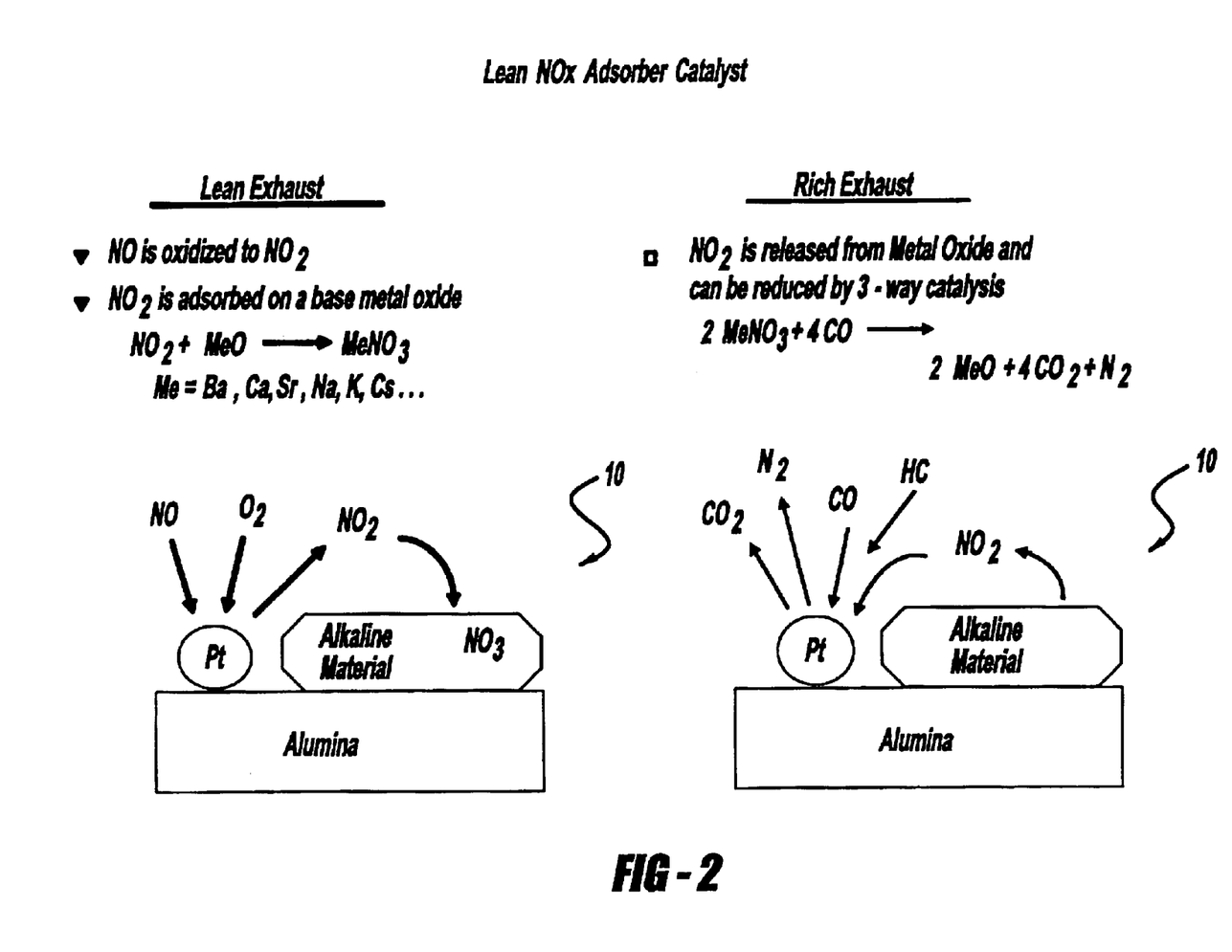
FIG. 2 is a diagrammatic drawing of a NOx trap used in the present invention.

FIG. 2 is a functional diagram of a NOx trap 10 utilizing metal oxides (MeO) as a trapping agent for NOx compounds during lean operating conditions and releasing NOx compounds during rich conditions. The reductant carbon monoxide and hydrocarbons in the relatively rich exhaust stream combine with the NOx and are converted to nitrogen and oxygen.

Figure 3:
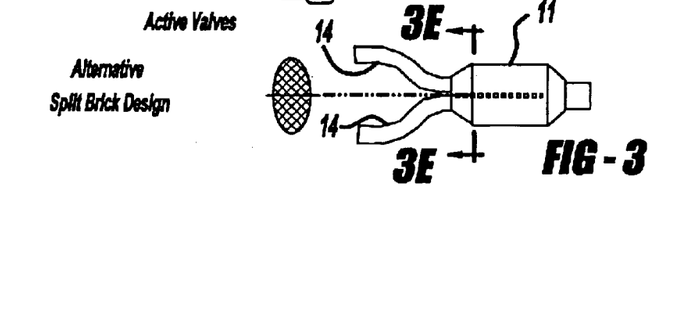
FIGS. 3A–3E are diagrammatic drawings of different engine configurations used in the present invention.
Figures 3A, 3C:
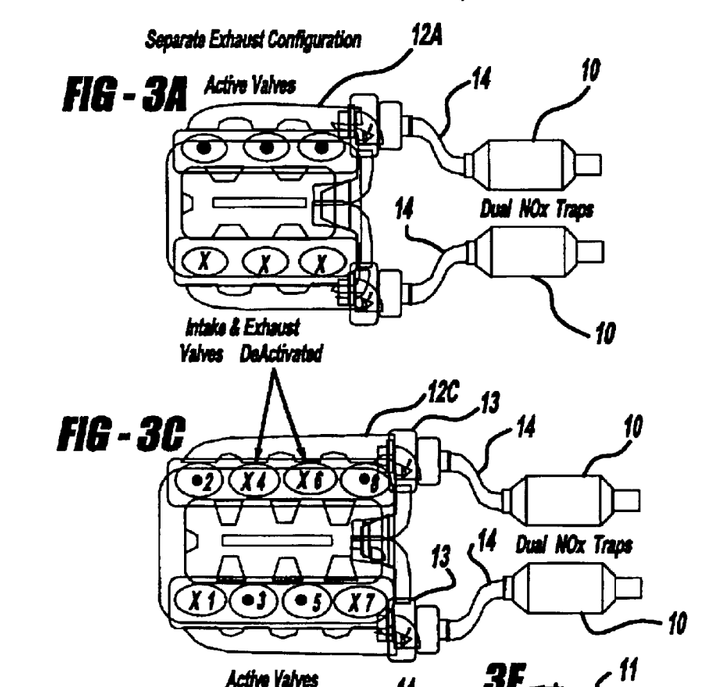
Figure 3B:
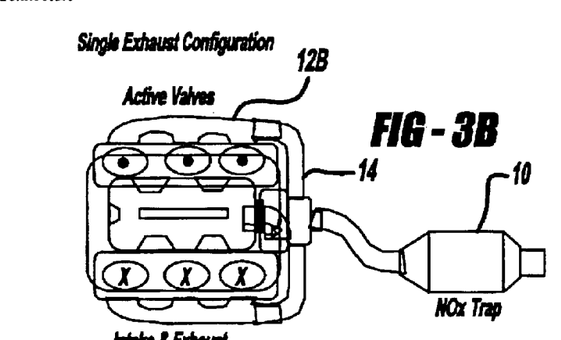

FIGS. 3A–3E include alternate variable displacement internal combustion engine (ICE) 12 configurations of the present invention. The ICE 12 is preferably a diesel engine but any ICE, including direct injection gasoline ICEs, is within the scope of the present invention. FIG. 3A is a diagrammatic drawing of a variable displacement six cylinder (ICE) 12A. The ICE 12A is coupled to exhaust manifolds 14 and dual NOx traps 10. Any cylinder in the ICE 12A may be deactivated but in the preferred embodiment an entire bank of cylinders (contiguous cylinders) is deactivated during the ICE 12A operation. FIG. 3B, similar to FIG. 3A, is a diagrammatic drawing of a variable displacement six cylinder ICE 12B. The ICE 12B is coupled to an exhaust manifold 14 and a NOx trap 10. In alternate configurations of the ICEs 12A–B, a turbocharger may be installed upstream of the NOx trap 10.

Figure 3D:
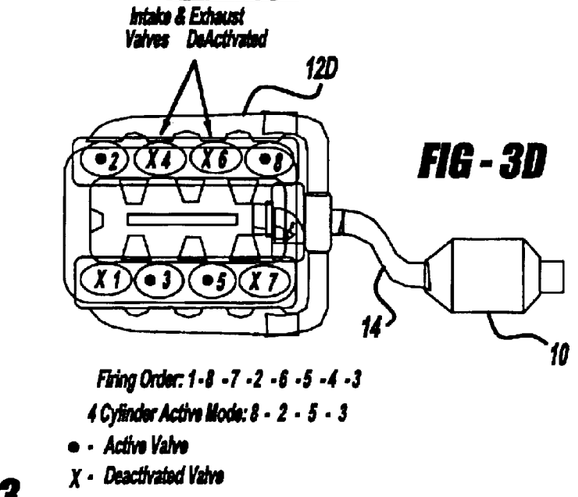

FIG. 3C is a diagrammatic drawing of a variable displacement eight cylinder ICE 12C with cylinders 1–8. The ICE 12C is coupled to exhaust manifolds 14 and dual NOx traps 10 to provide exhaust paths for optional turbochargers 13. Any cylinder in the ICE 12C may be deactivated, but in the preferred embodiment, cylinders 1, 4, 6 and 7 are deactivated during ICE 12C operation. FIG. 3D, similar to FIG. 3C, is a diagrammatic drawing of a variable displacement eight cylinder ICE 12D. The ICE 12D is coupled to exhaust manifolds 14 and a NOx trap 10.

In alternate embodiments, a split brick NOx trap 11, seen in FIG. 3E, may be used where the NOx trap 11 is coupled to the separate banks of an ICE 12 and has separate exhaust flows provided by exhaust manifolds 14. The NOx trap 11 with separate exhaust flow regions may be regenerated independent of each other.

During startup operation of the ICE 12, the exhaust temperature will be lower than the required light off temperature of the three-way catalyst and/or NOx trap 10. It will take the ICE 12 a number of engine cycles to reach the required light off temperature in the exhaust stream. The present invention will deactivate a portion of the cylinders in the ICE 12 to increase the load on the activated cylinders, leading to a relatively rapid increase in exhaust temperature, as compared to the ICE 12 operating in a fully displaced mode. This benefit will be amplified in diesel fueled engines that have difficulty in generating enough exhaust gas heat to support improved efficiencies in exhaust aftertreatment devices. The present invention will also utilize the deactivated cylinders as POx reactors to provide rich exhaust gas products to purge the NOx trap 10.

Figure 4A:
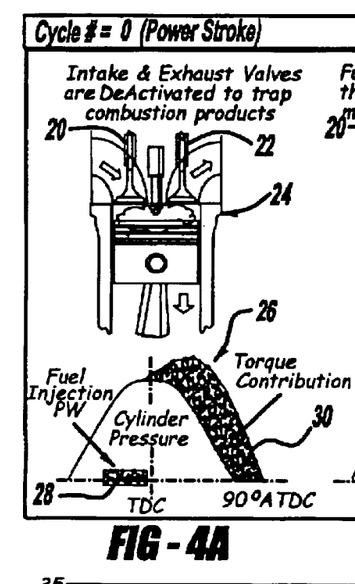
FIGS. 4A–4E are diagrammatic drawings and plots of the preferred method in the present invention.

FIG. 4A is a diagrammatic drawing of the partial oxidation process used at cycle zero of a cylinder 24. The cylinder 24 has been fueled with the fuel injection PW 28, required to meet the requested engine torque. The intake valve 20 and exhaust valve 22 of the cylinder 24 are then deactivated to trap combustion products within the cylinder chamber 24. The combustion products will include unburned hydrocarbons, carbon monoxide, hydrogen, oxides of nitrogen and nitrogen. As seen in plot 26, the normal fuel injection pulse 28 was implemented a few degrees before top dead center (TDC) and the corresponding increase in cylinder pressure results in the relative torque contribution is shown as plot 30.

Figure 4B:
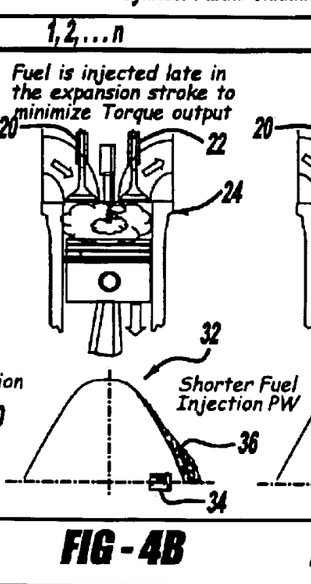
Figure 4C:
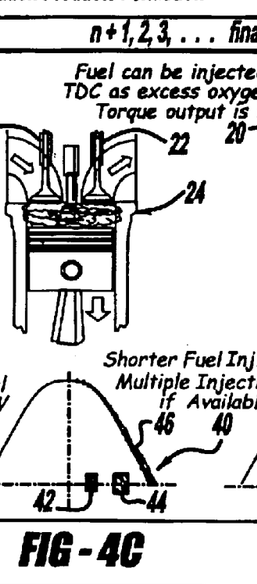
Figure 4D:
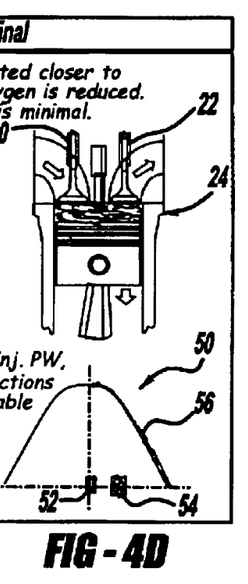

FIGS. 4B, 4C and 4D are diagrams of the fueling strategies for the subsequent expansion strokes of the deactivated cylinder 24 at cycles n+1, 2. . . final.

FIG. 4B is a diagram of the expansion stroke of the cylinder 24 at cycles 1 to n, where n is preferably three or less. For these cylinder cycles, there is still sufficient oxygen in the trapped combustion gases that additional fuel pulses may generate added torque. Therefore, the smaller fuel pulses are injected late in the expansion stroke to minimize torque disturbances. As seen in plot 32, the relatively smaller fuel injection pulse 34 is implemented relatively late in the expansion stroke to generate only a relatively small torque output as shown by plot 36.

In FIG. 4C, the additional fuel injection pulses can be advanced in the expansion stroke closer to TDC as the amount of excess oxygen in the chamber is reduced. Referring to plot 46, injection pulses 42 and/or 44 are implemented after TDC to minimize the torque disturbances as shown by plot 46. Similarly, plot 50 in FIG. 4D shows a small injection pulse 52 at TDC and an additional injection pulse 54 a few degrees after TDC to generate additional POx products while minimizing the torque disturbances as shown by plot 56.

Figure 4E:
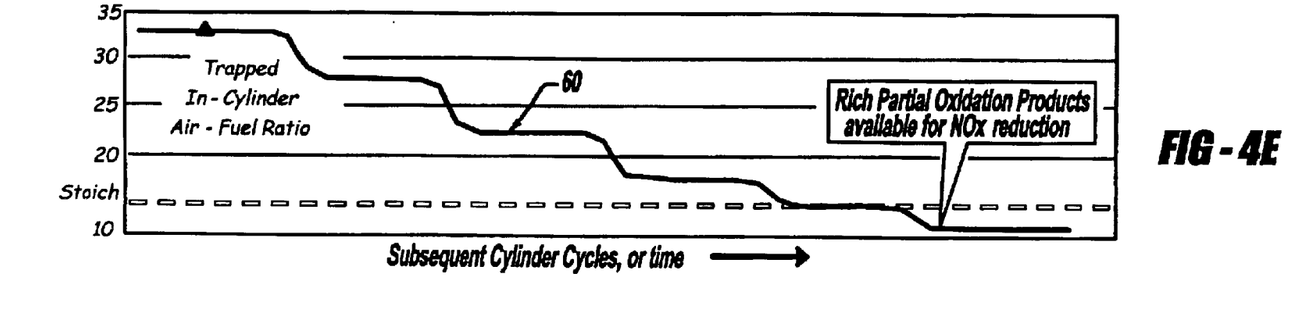

Referring to plot 60 in FIG. 4E, a trapped air/fuel ratio of the gases in the cylinders 24 for subsequent cylinder cycles or time is illustrated. As more cylinder cycles are executed for the deactivated cylinders, more fuel is added to the deactivated cylinders, enriching the in-cylinder environment with POx products such as carbon monoxide, hydrogen, and nitrogen. The POx products may be added to the exhaust stream of the engine 12 upon reactivation of the exhaust and intake valves 22 and 20. The POx products can then be used to regenerate the NOx trap 10.

Figure 5:
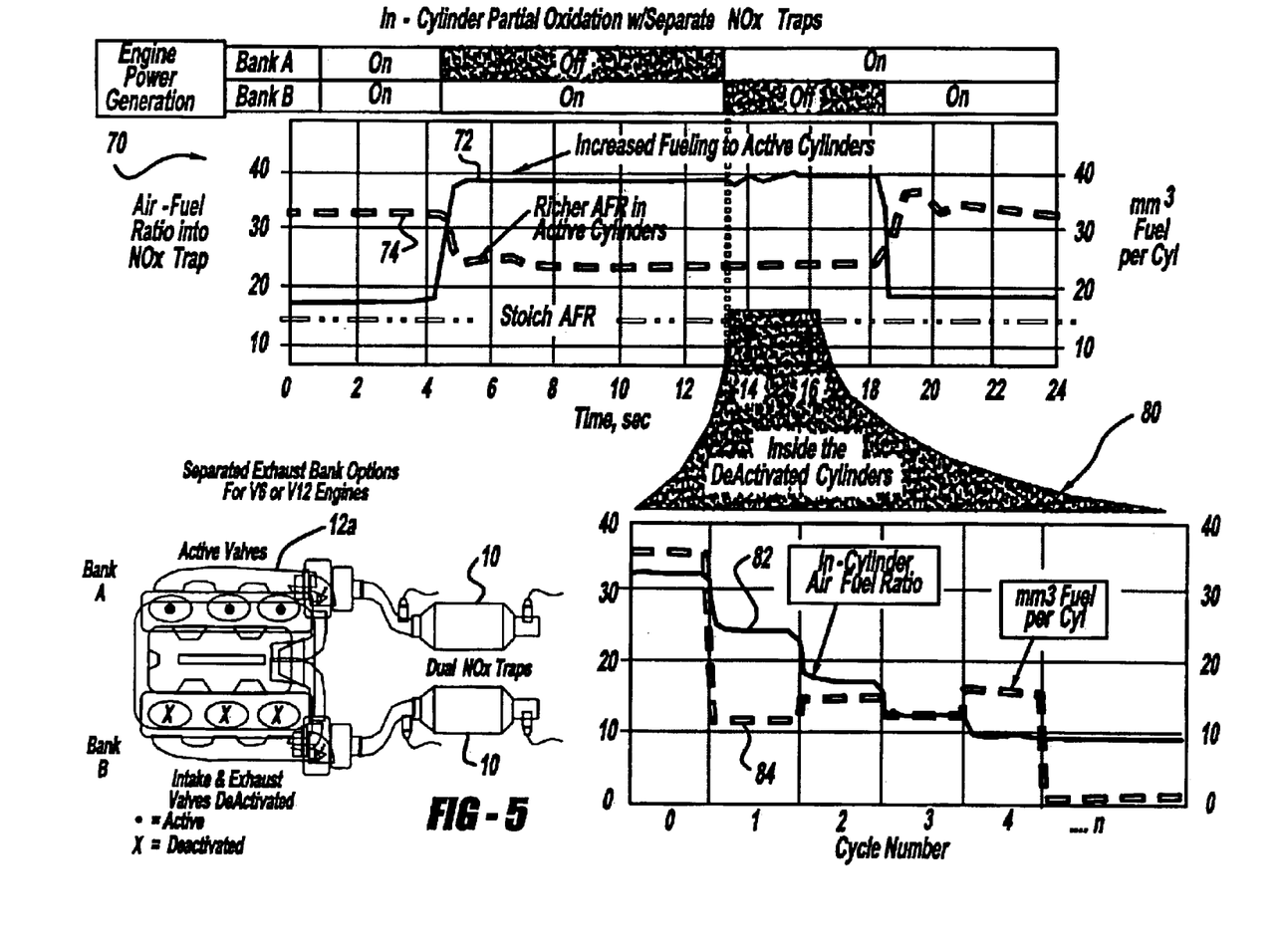
FIG. 5 is a diagrammatic drawing and plots of the operation of a V6 engine with a plurality of NOx traps.

Referring to FIG. 5, the engine 12A is shown with dual NOx traps 10. A bank of cylinders has been deactivated in engine 12A. Plot 70 illustrates engine power generation for the engine 12A and air/fuel ratio versus time. Line 72 illustrates the increased fueling to the active cylinders need for power requirements and line 74 illustrates the richer air/fuel ratio in the active cylinders. When one bank of cylinders is deactivated, the remaining active bank must increase its power output to compensate for the power drop. In the case of a diesel engine, engine power output is directly related to the amount of fuel supplied to the diesel engine.

Plot 80 in FIG. 5 illustrates the partial oxidation product generation in the deactivated cylinders. Line 82 illustrates the in-cylinder air fuel ratio and line 84 illustrates the fuel added to the deactivated cylinder(s). As previously described, the POx products are used to regenerate the NOx traps. The active banks of the six cylinder engine are alternated as needed to regenerate each of the NOx traps 10. Specific times and sequencing may be calibrated to ensure that the NOx traps 10 are regenerated.

Figure 6:
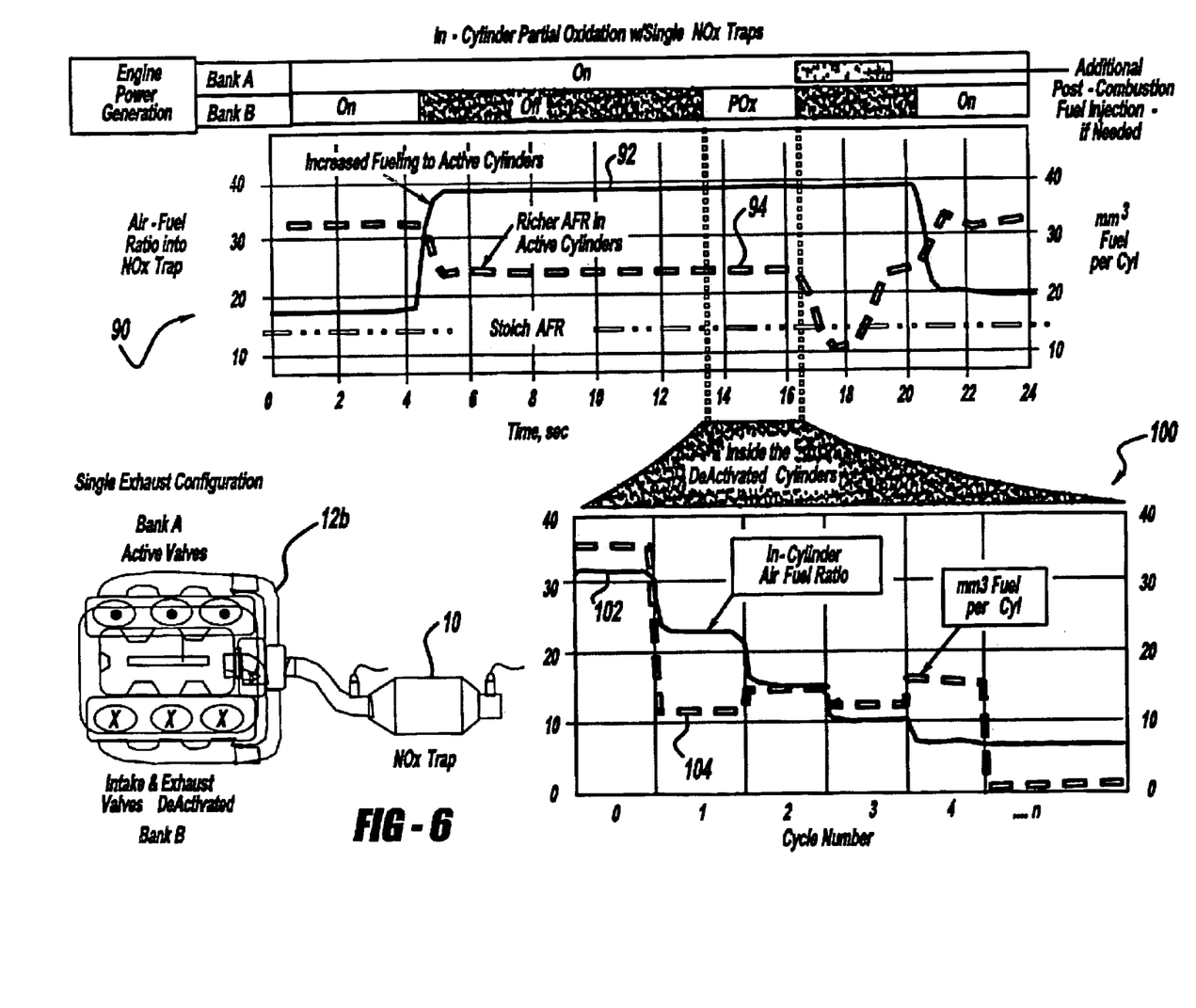
FIG. 6 is a diagrammatic drawing and plots of the operation of a V6 engine with a single NOx trap.

Referring to FIG. 6, the engine 12B is shown with a single NOx trap 10. A bank of cylinders has been deactivated in engine 12B. Plot 90 illustrates engine power generation for the engine 12B and air/fuel ratio versus time. Line 92 illustrates the increased fueling to the active cylinders need for power requirements and line 94 illustrates the richer air/fuel ratio in the active cylinders. When one bank of cylinders is deactivated, the remaining active bank must increase its power output to compensate for the power drop.

Plot 100 in FIG. 6 illustrates the partial oxidation product generation in the deactivated cylinders. Line 102 illustrates the in-cylinder air/fuel ratio and line 104 illustrates the fuel added to the deactivated cylinder(s). As previously described, the POx products are used to regenerate the NOx traps. Specific times and sequencing may be calibrated to ensure that the NOx trap 10 is regenerated.

Figure 7:
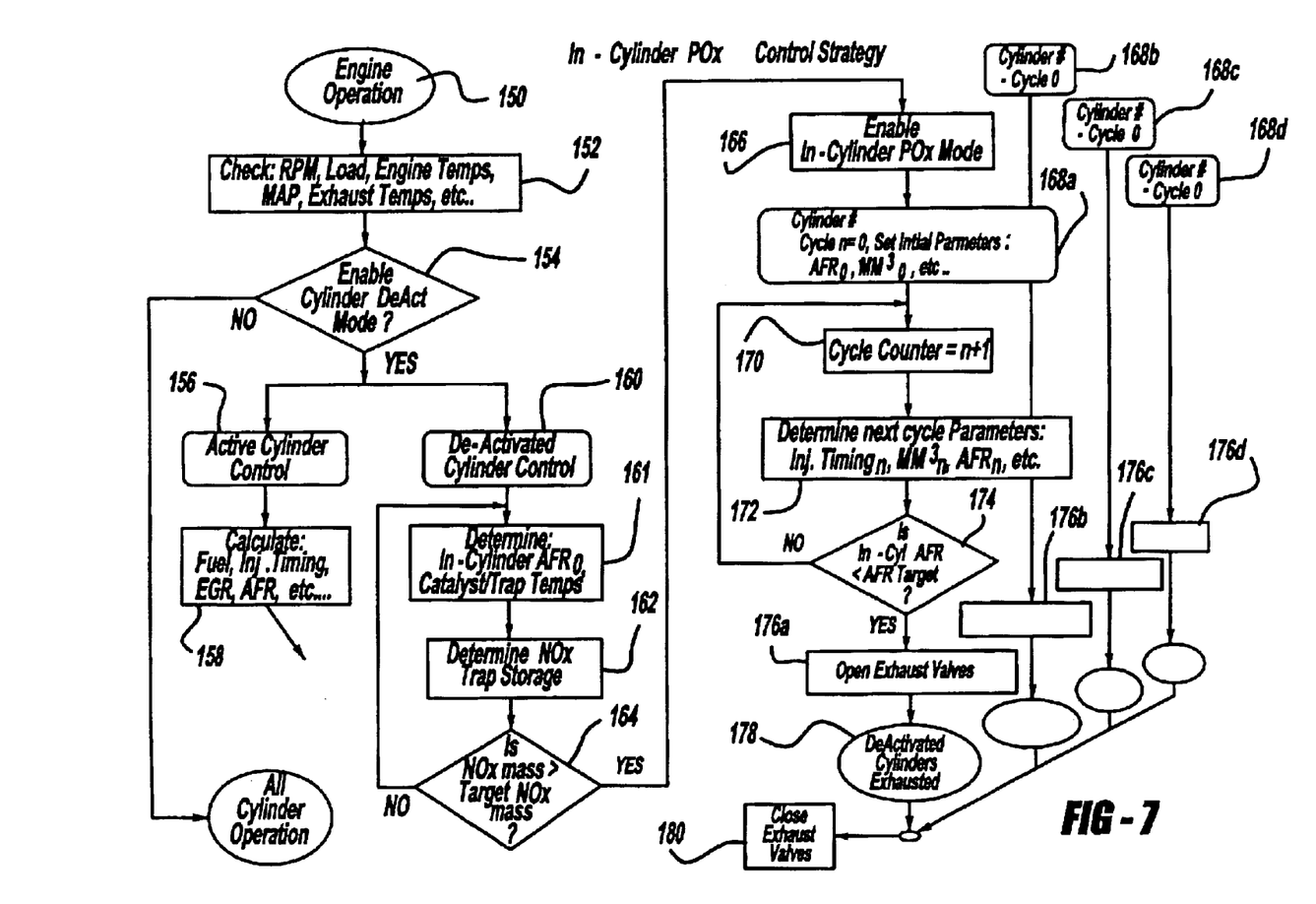
FIG. 7 is a flowchart of a preferred method of the present invention.

A preferred method of operation for the present invention is shown in FIG. 7. The method starts at block 150 where the variable displacement diesel ICE 12 is operating in full displacement. At block 152 the method samples various engine process parameters such as RPM, load, engine temp, manifold pressure and/or exhaust temperatures. Block 154 determines if the ICE 12 may be operated in a partially displaced configuration with reference to the power demand of the ICE 12. If the required engine power is greater than the output of the ICE 12 in a partially displace configuration, the ICE 12 is operated in full displacement. If the power requirement are within the output of a partially displaced configuration, the ICE 12 will be allowed to operate in a partially displaced configuration.

Active cylinder control is executed at blocks 156 and 158 for the active cylinders. Deactivated cylinder control begins at block 160. At block 161, the in-cylinder air/fuel ratios are determined and the NOx trap temperature is determined. NOx trap 10 storage or saturation is determined at block 162. Block 164 determines if the NOx mass chemically stored on the NOx trap 10 is greater than the target NOx mass. The target NOx mass is a value below the saturation level of the NOx trap 10. If the NOx mass is less than the target NOx mass, the method will return to block 160. Else, the in-cylinder POx mode will be enabled at block 166. At block 168 (*a–d* refer to the number of cylinders deactivated), the initial parameters upon deactivation (cycle zero) are set. The initial values of in-cylinder air/fuel ratio, fuel quantity (mm3), exhaust gas recirculation, and other variables can be used to determine the POx generation fuel quantity and injection timing schedule for the subsequent cylinder cycles, as described in FIG. 4.

The engine cycle counter is incremented at block 170. If the in-cylinder air/fuel ratio is less than the air/fuel ratio target, then the method will return to block 170 to inject more diesel fuel into the deactivated cylinders. If the air/fuel ratio in the deactivated cylinders has reached the required level, then the cylinders will be reactivated, exhausting the POx products into the exhaust stream to regenerate the NOx trap at blocks 176 and 178. The exhaust valves are then closed at block 180 and the evacuated POx generating cylinders are controlled by the requested engine operating mode.

While this invention has been described in terms of some specific embodiments, it will be appreciated that other forms can readily be adapted by one skilled in the art. Accordingly, the scope of this invention is to be considered limited only by the following claims.

What is claimed is:

1. An engine control system in a vehicle comprising:
   a variable displacement internal combustion engine;
   a controller for controlling the displacement of said variable displacement compression ignition internal combustion engine;
   a NOX trap coupled to the exhaust of said variable displacement internal combustion engine,
   wherein said controller operates said variably displacement internal combustion engine in a partially displaced operating mode upon startup to increase exhaust gas temperature;
   wherein said controller deactivates a portion of the cylinders in the variable displacement internal combustion engine;
   wherein fuel is injected into said deactivated cylinders to generate partial oxidation products; and
   wherein said partial oxidation products are released into the exhaust of said variable displacement internal combustion engine to regenerate said NOx trap.

2. The engine control system of claim 1, wherein said variable displacement internal combustion engine is a diesel engine.

3. The engine control system of claim 1, wherein said partial oxidation products include carbon monoxide, hydrogen, hydrocarbons or nitrogen.

4. The engine control system of claim 1, wherein said variable displacement internal combustion engine is an eight cylinder engine.

5. The engine control system of claim 1 wherein said variable displacement internal combustion engine is a six cylinder engine.

6. The engine control system of claim 1, further including at least one turbocharger coupled to the exhaust of said variable displacement internal combustion engine.

7. A method of controlling a variable displacement diesel internal combustion engine comprising:
operating the variable displacement diesel internal combustion engine in a partially displaced operating mode;
injecting fuel in deactivated cylinders in said variable displacement internal combustion engine to generate partial oxidation products; and
releasing said partial oxidation products into an exhaust stream of said variable displacement diesel internal combustion engine to regenerate a catalytic device.

8. The method of claim 7, wherein said catalytic device is a NOx trap.

* * * * *